US011153930B2

(12) United States Patent
Kim et al.

(10) Patent No.: US 11,153,930 B2
(45) Date of Patent: Oct. 19, 2021

(54) METHOD FOR TRANSMITTING OR RECEIVING SIGNAL IN WIRELESS COMMUNICATION SYSTEM AND DEVICE FOR THE SAME

(71) Applicant: LG Electronics Inc., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 16/279,500

(22) Filed: Feb. 19, 2019

(65) Prior Publication Data
US 2019/0261449 A1 Aug. 22, 2019

Related U.S. Application Data

(60) Provisional application No. 62/631,906, filed on Feb. 18, 2018.

(30) Foreign Application Priority Data

Jan. 2, 2019 (KR) .......................... 10-2019-0000185
Jan. 4, 2019 (KR) .......................... 10-2019-0001046

(51) Int. Cl.
*H04W 76/18* (2018.01)
*H04W 68/00* (2009.01)
(Continued)

(52) U.S. Cl.
CPC ......... *H04W 80/02* (2013.01); *H04L 65/1016* (2013.01); *H04W 48/16* (2013.01);
(Continued)

(58) Field of Classification Search
CPC .. H04L 65/1016; H04L 65/105; H04W 60/00; H04W 68/005; H04W 76/27; H04W 80/02; H04W 76/30
See application file for complete search history.

(56) References Cited

U.S. PATENT DOCUMENTS

2018/0199279 A1* 7/2018 Baek ................... H04W 72/02
2018/0199398 A1* 7/2018 Dao .................... H04L 65/1069
(Continued)

FOREIGN PATENT DOCUMENTS

WO WO2017142362 8/2017

OTHER PUBLICATIONS

CATT, "Interaction Between SMF and UDF During the Inter-System Change," S2-180653, 3GPP TSG-SA WG2 Meeting #125, Gothenburg, Sweden, Jan. 22-26, 2018, 14 pages.

(Continued)

*Primary Examiner* — Faruk Hamza
*Assistant Examiner* — Abusayeed M Haque
(74) *Attorney, Agent, or Firm* — Fish & Richardson P.C.

(57) ABSTRACT

A method for transmitting or receiving a signal of a Session Management Function (SMF) in a wireless communication system comprises receiving a reject message for a message related to an activation command of a Protocol Data Unit (PDU) session, by the SMF, from a User Equipment (UE); requesting, to an AMF, an Access Management Function (AMF) information on a non-3GPP connection state modification of the UE by the SMF; receiving a message indicating that a non-3GPP connection state of the UE has been changed, by the SMF, from the AMF; and transmitting the message related to the activation command of the PDU session, which includes a new P-CSCF(Proxy-Call Session Control Function) list, by the SMF, to the UE, wherein the message indicating that the non-3GPP connection state of the UE has been changed indicates that a non-3GPP access of the UE has been changed from CM-IDLE to CM-connected.

12 Claims, 12 Drawing Sheets

(51) Int. Cl.

| | |
|---|---|
| *H04L 29/06* | (2006.01) |
| *H04W 80/02* | (2009.01) |
| *H04W 76/27* | (2018.01) |
| *H04W 76/10* | (2018.01) |
| *H04W 48/16* | (2009.01) |
| *H04W 64/00* | (2009.01) |
| *H04W 60/00* | (2009.01) |

(52) U.S. Cl.
CPC ......... *H04W 60/00* (2013.01); *H04W 64/003* (2013.01); *H04W 68/005* (2013.01); *H04W 76/10* (2018.02); *H04W 76/18* (2018.02); *H04W 76/27* (2018.02)

(56) References Cited

U.S. PATENT DOCUMENTS

| | | | | |
|---|---|---|---|---|
| 2019/0215729 A1* | 7/2019 | Oyman | ................... | H04L 65/80 |
| 2019/0335392 A1* | 10/2019 | Qiao | ..................... | H04W 76/27 |
| 2019/0342921 A1* | 11/2019 | Loehr | ................... | H04L 5/0053 |
| 2019/0357092 A1* | 11/2019 | Jung | ................ | H04W 36/0055 |
| 2020/0053133 A1* | 2/2020 | Atari us | .............. | H04L 65/1006 |
| 2020/0153875 A1* | 5/2020 | Karampatsis | ....... | H04L 65/1073 |
| 2020/0178336 A1* | 6/2020 | Li | .......................... | H04L 65/105 |
| 2020/0280836 A1* | 9/2020 | Velev | ..................... | H04W 8/12 |
| 2020/0305211 A1* | 9/2020 | Foti | ..................... | H04L 65/1016 |

OTHER PUBLICATIONS

InterDigital Inc., "UE Requested Multi-access PDU Session Establishment," S2-180449, SA WG2 Meeting #125, Gothenburg, Sweden, Jan. 22-26, 2018, 6 pages.

3rd Generation Partnership Project; Technical Specification Group Core Network and Terminals; "5G System—Phase 1; CT WG1 Aspects (Release 15)," 3GPP TR 24.890 V15.0.0, Dec. 28, 2017, 6 pages.

3rd Generation Partnership Project; Technical Specification Group Services and System Aspects; "Procedures for the 5G System; Stage 2 (Release 15)," 3GPP TS 23.502 V15.0.0, Dec. 22, 2017, 6 pages.

\* cited by examiner

METHOD FOR TRANSMITTING OR RECEIVING SIGNAL IN WIRELESS COMMUNICATION SYSTEM AND DEVICE FOR THE SAME

CROSS-REFERENCE TO RELATED APPLICATIONS

This application claims the benefit of the U.S. Patent Application No. 62/631,906, filed on Feb. 18, 2018, Korean Patent Application No. 10-2019-0000185, filed on Jan. 2, 2019, and Korean Patent Application No. 10-2019-0001046, filed on Jan. 4, 2019. The disclosures of the prior applications are incorporated by reference in their entirety.

BACKGROUND OF THE INVENTION

Field of the Invention

The following description relates to a wireless communication system, and more particularly, to a method for transmitting or receiving a signal of an SMF in case of P-CSCF failure and a device for the same.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

SUMMARY OF THE INVENTION

Accordingly, the present invention is directed to a method for transmitting or receiving a signal in a wireless communication system and a device for the same, which substantially obviate one or more problems due to limitations and disadvantages of the related art.

An object of the present invention is to provide a method for transmitting or receiving a signal by means of an SMF regarding a case that an AMF unconditionally transmits a session management message for a PDU session associated with a non-3GPP access to a UE in case of P-CSCF failure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the objects of the present invention, a method for transmitting or receiving a signal of a Session Management Function (SMF) in a wireless communication system according to one embodiment of the present invention comprises receiving a reject message for a message related to an activation command of a Protocol Data Unit (PDU) session, by the SMF, from a User Equipment (UE); requesting, to an AMF, information on a non-3GPP connection state modification of the UE by the SMF; receiving a message indicating that a non-3GPP connection state of the UE has been changed, by the SMF, from the AMF; and transmitting the message related to the activation command of the PDU session, which includes a new P-CSCF(Proxy-Call Session Control Function) list, by the SMF, to the UE, wherein the message indicating that the non-3GPP connection state of the UE has been changed indicates that a non-3GPP access of the UE has been changed from CM-IDLE to CM-connected.

To achieve the objects of the present invention, a Session Management Function (SMF) in a wireless communication system according to one embodiment of the present invention comprises a memory; and at least one processor coupled to the memory, wherein the at least one processor receives a reject message (PDU Session Modification Command Reject) for a message related to an activation command of a PDU Session from a UE, requests, to an AMF, information on a non-3GPP connection state modification of the UE, receives a message indicating that a non-3GPP connection state of the UE has been changed, from the AMF, and transmits the message related to the activation command of the PDU Session, which includes a new P-CSCF list, to the UE, wherein the message indicating that the non-3GPP connection state of the UE has been changed indicates that a non-3GPP access of the UE has been changed from CM-IDLE to CM-connected.

The message related to the activation command of the PDU session may be transmitted to the UE in a state of P-CSCF failure.

The message related to the activation command of the PDU session may not be transmitted when the SMF determines that P-CSCF having the P-CSCF failure has been restored.

The SMF may determine to delay transmission of the new P-CSCF list based on the reject message.

The message related to the activation command of the PDU session may be transmitted to the UE regardless of whether the UE can activate the PDU session through the 3GPP access.

The message indicating that the non-3GPP connection state of the UE has been changed may be Nsmf_PDUSession_UpdateSMContext Request message when IMS PDU session is activated.

The message indicating that the non-3GPP connection state of the UE has been changed may be Namf_EventExposure_Notify message when IMS PDU session is not activated.

The PDU session may be a non-3GPP PDU session.

The message related to the activation command of the PDU session may be a PDU Session Modification Command.

The UE may be registered with the same PLMN with respect to the 3GPP access and the non-3GPP access.

According to the present invention, a problem related to meaningless transmission of a new P-CSCF list to a UE which cannot activate a PDU Session in a 3GPP access or a problem that the UE cannot use IMS message can be solved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings.

DETAILED DESCRIPTION OF THE INVENTION

Figure 1:
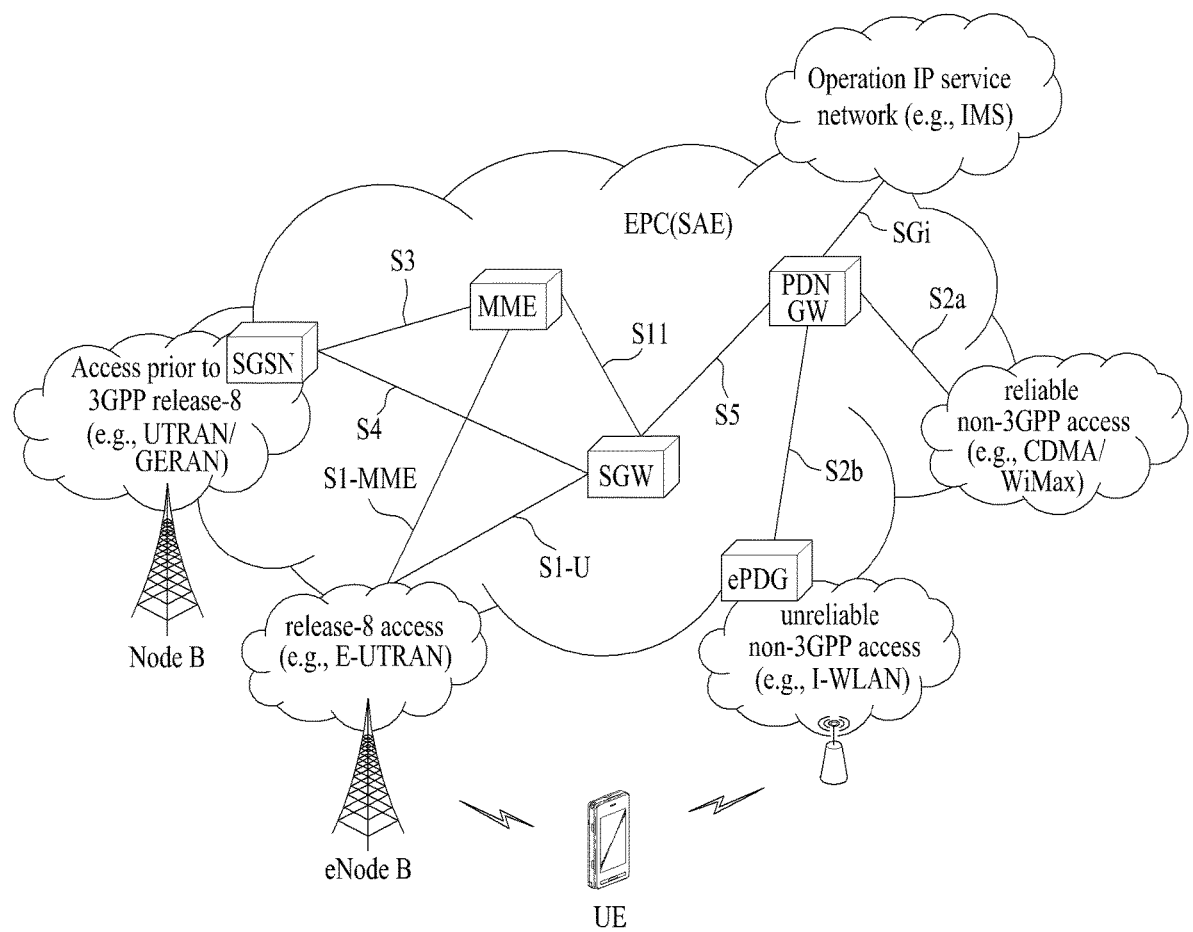
FIG. 1 is a diagram showing a schematic structure of an evolved packet system (EPS) including an evolved packet core (EPC)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MIMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an |

TABLE 1-continued

| Reference point | Description |
|---|---|
| | operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
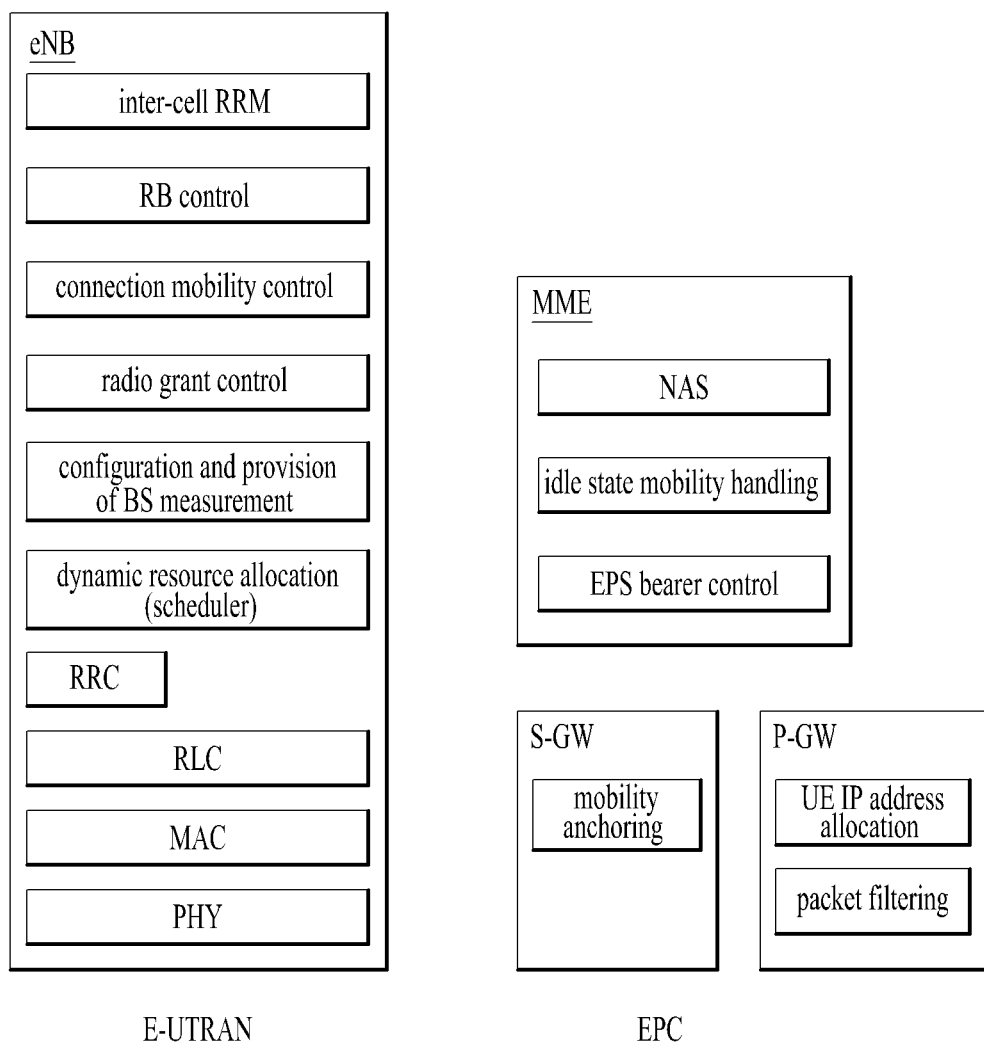
FIG. 2 is an exemplary diagram illustrating an architecture of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
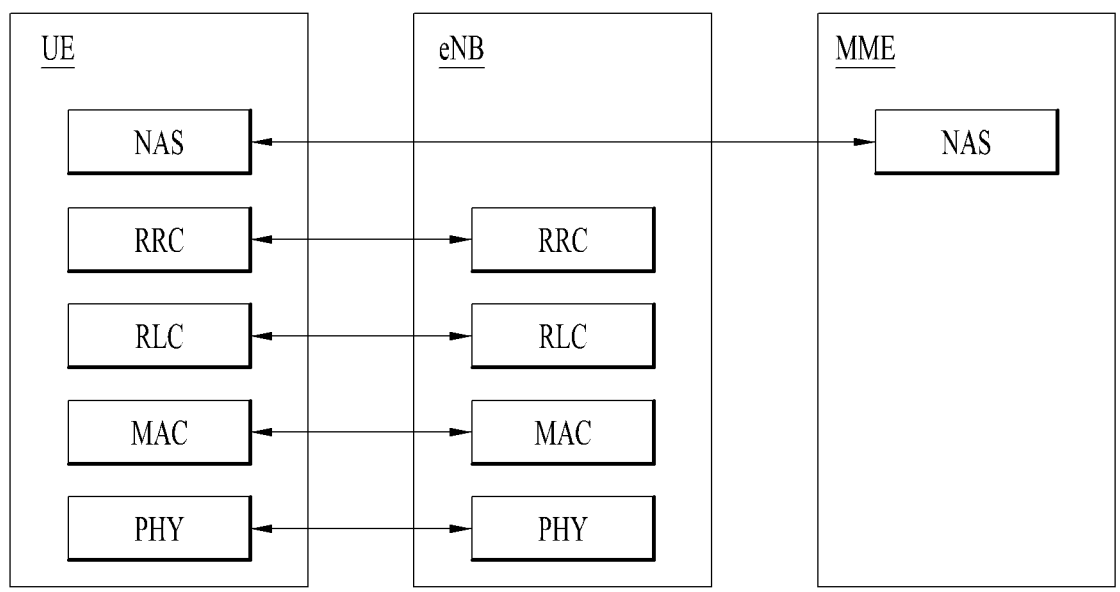
FIG. 3 is an exemplary diagram illustrating a structure of a wireless interface protocol in a control plane.
Figure 4:
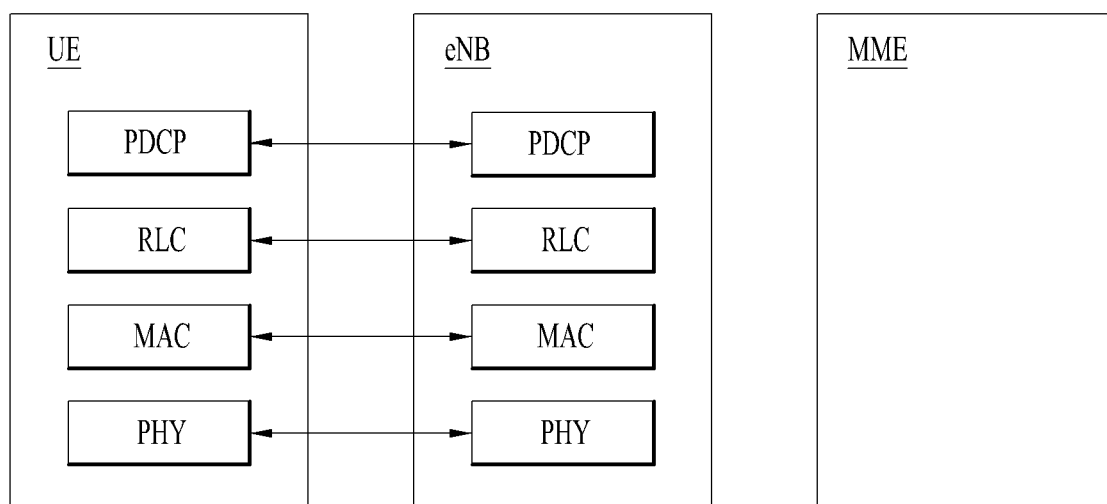
FIG. 4 is an exemplary diagram illustrating a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
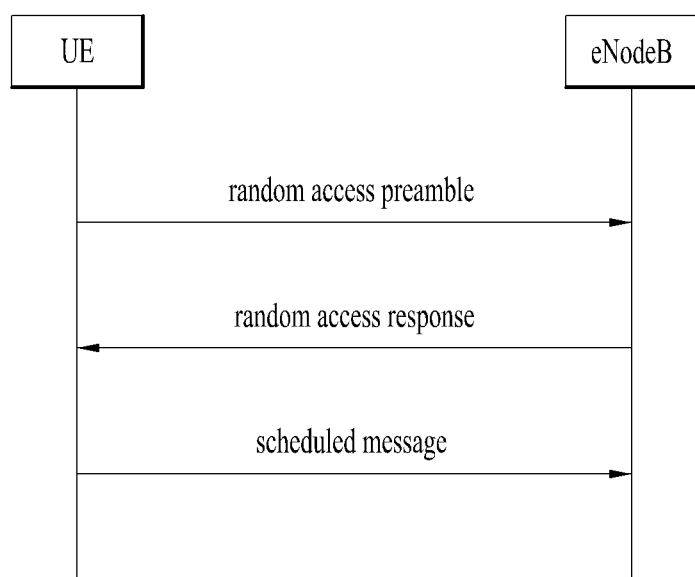
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB.

The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
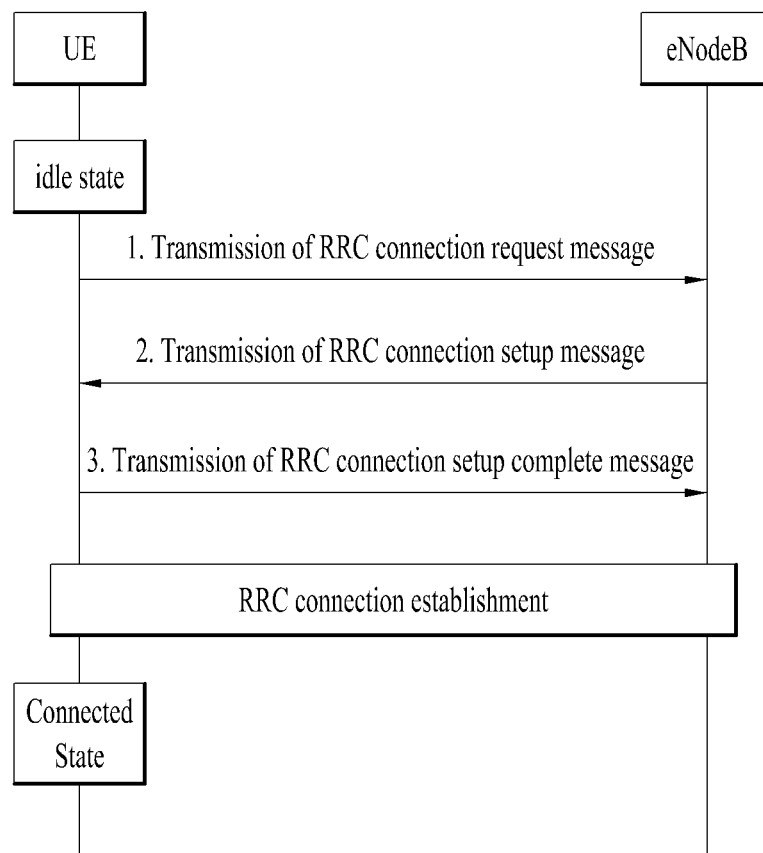
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
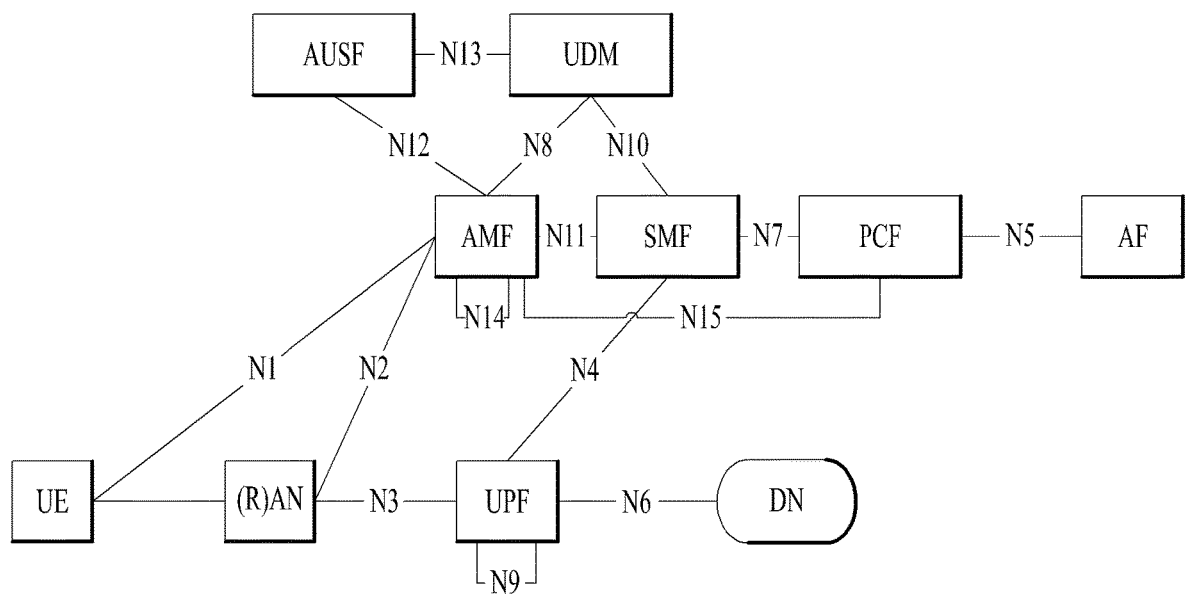
FIG. 7 is a diagram illustrating a 5G system.

In the legacy EPC, MME is categorized into AMF(Core Access and Mobility Management Function) and SMF(session Management Function) in a Next Generation system (or 5G core network (CN)). Therefore, NAS interaction and MM (Mobility Management) with the UE are performed by the AMF, and SM (Session Management) is performed by the SMF. Also, the SMF manages a UPF (User plane Function) which is a gateway having a user-plane function, that is, for routing user traffic. In this case, a control-plane portion of S-GW and P-GW in the legacy EPC may be managed by the SMF, and a user-plane portion may be managed by the UPF. For routing of user traffic, one or more UPFs may exist between RAN and DN (Data Network). That is, the legacy EPC may be configured in 5G as illustrated in FIG. 7. Also, as a concept corresponding to PDN connection in the legacy EPS, a PDU (Protocol Data Unit) session is defined in the 5G system. The PDU session refers to association between a UE, which provides PDU connectivity services of Ethernet type or unstructured type as well as IP type, and a DN. In addition, a UDM (Unified Data Management) performs a function corresponding to HSS of EPC, and PCF (Policy Control Function) performs a function corresponding to PCRF of the EPC. To satisfy requirements of the 5G system, the functions may be provided in an enlarged type. Details of the 5G system architecture, each function and each interface follow TS 23.501.

The 5G system is tasked in TS 23.501, TS 23.502 and TS 23.503. Therefore, in the present invention, the 5G system follows the above specifications. Also, more detailed architecture and details related to NG-RAN follow TS 38.300. The 5G system supports non-3GPP access, and thus details such as architecture for supporting non-3GPP access and network element are described in clause 4.2.8 of TS 23.501. Procedures for supporting non-3GPP access are described in clause 4.12 of TS 23.502. A main example of non-3GPP access may include WLAN access that may include a trusted WLAN and an untrusted WLAN. The AMF of the 5G system performs Registration Management (RM) and Connection Management (CM) for non-3GPP access as well as 3GPP access. In this way, as the AMF serves the UE for 3GPP access and non-3GPP access, which belong to the same PLMN, one network function may integrally and efficiently support authentication, mobility management, session management, etc. with respect to the UE registered through two different accesses.

Figure 8:
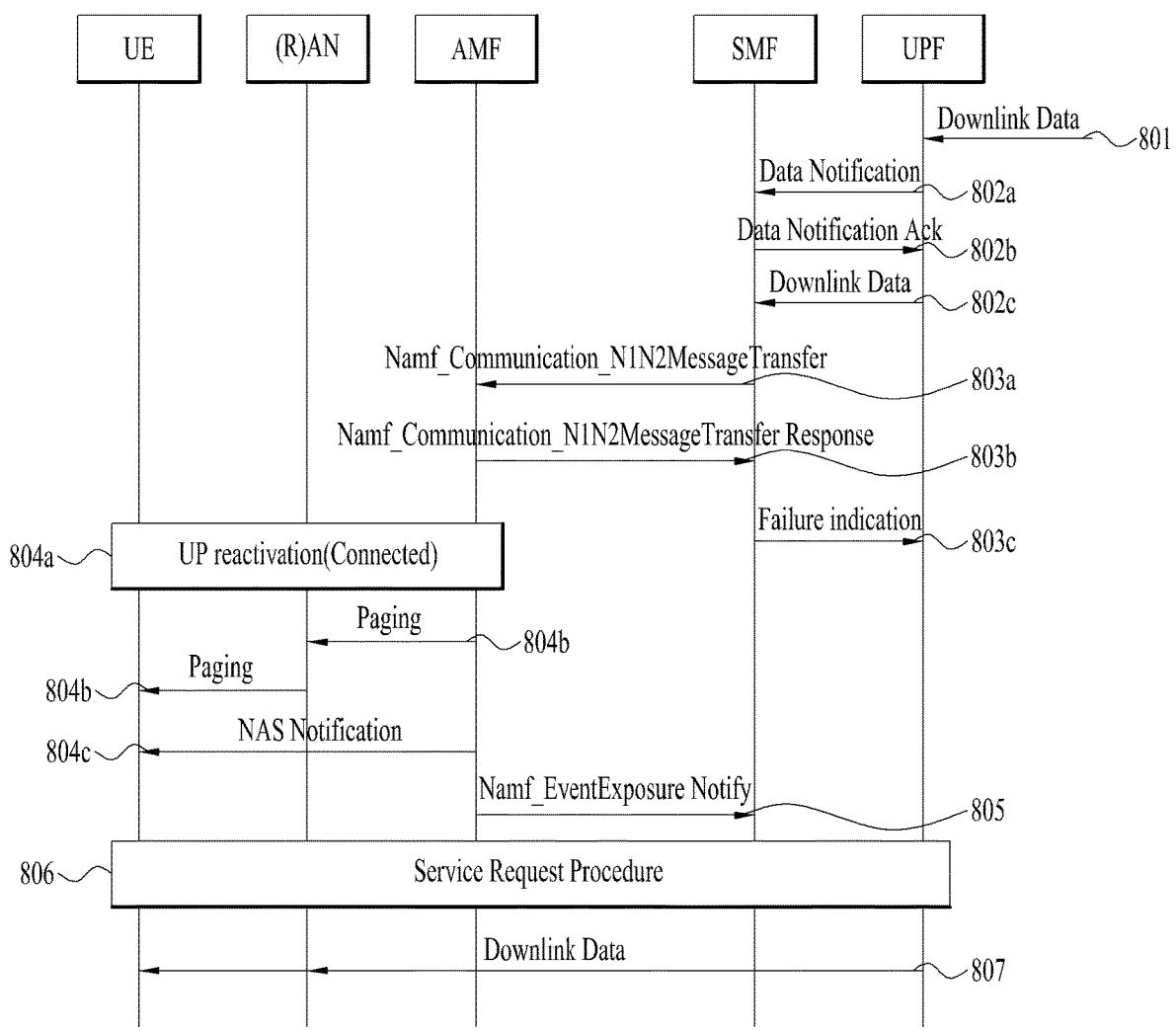
FIG. 8 illustrates a network triggered service request procedure.

An operation in case of occurrence of downlink data (or downlink traffic) of a PDU session associated with the non-3GPP access when the UE registered with the same PLMN with respect to the 3GPP access and the non-3GPP access is CM-IDLE in the non-3GPP access is described in clause 4.2.3.3 of TS 23.502. Specifically, if the 3GPP access is CM-IDLE in the above case, the AMF may page the UE through the 3GPP access (see step 4b of clause 4.2.3.3 of TS 23.502). Unlike this case, when the 3GPP access is CM-CONNECTED, the AMF may transmit a NAS notification message to the UE through the 3GPP access (see step 4c of clause 4.2.3.3 of TS 23.502). A network triggered service request procedure of clause 4.2.3.3 of TS 23.502 is shown in FIG. 8, and its detailed description will be understood with reference to the description in clause 4.2.3.3 of TS 23.502.

It is obscure whether the UE will perform paging or NAS notification message transmission through the 3GPP access when downlink signaling occurs for the PDU session (hereinafter, referred to as non-3GPP PDU session) currently associated with the non-3GPP access, like the occurrence of downlink data when the UE is CM-IDLE in the non-3GPP access. However, it may be considered that downlink signaling for the non-3GPP PDU session is reported to the UE using the 3GPP access equally to the downlink data for the non-3GPP PDU session. Examples of the downlink signal related to the PDU session include a PDU Session Modification Command/Request message, a PDU Session Release Command/Request message, etc.

Particularly, regarding Session Modification, the SMF performs a PDU Session Modification procedure to provide the UE with a new P-CSCF list (this is a new list of P-CSCF addresses) due to occurrence of P-CSCF failure on IMS. A detailed P-CSCF Restoration related procedure in 5G regarding P-CSCF failure is disclosed in clause 5.8 of TS 23.380, and is referred to as the related art of the present invention.

Subsequently, when P-CSCF failure occurs, particularly, when the UE is registered with the same PLMN (EPLMN) for the 3GPP access and the non-3GPP access, an IMS PDU session (this is a PDU session for IMS of DNN) of the UE is a non-3GPP access PDU Session and the UE is CM-IDLE state in the non-3GPP access, the SMF may perform a PDU Session Modification procedure to provide a new list of P-CSCFs with respect to the IMS PDU Session.

However, when the UE cannot activate the IMS PDU session on the 3GPP access (or when the UE cannot move/handover the IMS PDU session to the 3GPP access), it is meaningless that the UE receives a PDU Session Modification Command that includes a new list of P-CSCFs. This is because that the UE which has received the new list of P-CSCFs should perform IMS registration toward a new P-CSCF but cannot activate the IMS PDU Session on the 3GPP access as described above. (For details of this case, refer to step 13 of FIG. 5.1.2a of TS 23.380 or step 9 of FIG. 5.8.4.2-1 of TS 23.380.) Also, according to FIG. 5.8.4.2-1 of TS 23.380, when the UE is able to be shifted to the CM-CONNECTED state in the non-3GPP access, the UE transmits IMS signal to a previous P-CSCF, that is, failed P-CSCF. Since the IMS signal transmitted from the UE to the previous P-CSCF cannot be processed as far as the P-CSCF is not restored, the UE cannot use the IMS service. Also, regarding IMS signal toward the UE, since the S-CSCF which is serving the UE does not perform update for the P-CSCF which is serving the UE (since the UE does not perform IMS registration with the S-CSCF through a new P-CSCF), the S-CSCF cannot transfer the IMS signal to the UE normally.

Therefore, a method for signal transmission and reception between network nodes to avoid a status that the IMS signal is not transferred when P-CSCF failure occurs will be described hereinafter. In the following description, activation of a User Plane for the PDU Session may be expressed as activation of User Plane connection for the PDU Session, N3 activation for the PDU Session, N3 tunnel activation for the PDU Session, and activation of the PDU Session.

Embodiment 1

The first embodiment relates to an operation of network nodes or UE, which include(s) SMF when the AMF unconditionally transmits a Session Management (SM) message for a PDU session associated with the non-3GPP access to the UE through the 3GPP access regardless of whether the UE can activate the PDU session through the 3GPP access.

First of all, the operation will be described in detail with reference to FIG. 9 after an operation based on the SMF and the UE is described. The SMF according to one embodiment of the present invention may receive a reject message (for example, PDU Session Modification Command Reject) for a message related to an activation command of the PDU session from the UE. In this case, the SMF may request, to an AMF, information on non-3GPP connection state modification of the UE. Afterwards, when the non-3GPP connection state of the UE is changed, the SMF may receive, from the AMF, a message indicating that the non-3GPP connection state of the UE has been changed. The SMF which has received the message may transmit, to the UE, a message related to an activation command of the PDU session, which includes a new P-CSCF list. The UE may perform an IMS registration procedure with a new P-CSCF included in the new P-CSCF list.

The message indicating that the non-3GPP connection state of the UE has been changed may indicate that the non-3GPP access of the UE has been changed from CM-IDLE to CM-connected. That is, when the SM message for the PDU session associated with the non-3GPP access is transmitted to the UE of a non-3GPP IDLE state through the 3GPP access regardless of whether the UE can activate the PDU Session through the 3GPP access, the UE which cannot activate the PDU Session in the 3GPP access transmits a reject message for the SM message. In this case, as described above, it is meaningless that the new P-CSCF list is transmitted to the UE. However, if there is no action, a problem occurs in that the UE transmits the IMS message to the previous P-CSCF and thus the IMS message cannot be used. Therefore, as described above, the SMF may solve the problem by transmitting the new P-CSCF list to the UE after the connection state with the UE is changed. That is, the SMF determines to delay (later transmit) the new P-CSCF list transmission based on the reject message and transmits the new P-CSCF list to the UE after the UE is connected in the non-3GPP.

The message related to the activation command of the PDU session is transmitted to the UE in the state of P-CSCF failure. If the SMF determines that the PC-CSCF where the P-CSCF failure occurred has been restored, the SMF may not perform the activation command of the PDU session. This is because that it is more efficient to transmit or receive the IMS message through the restored P-CSCF than IMS registration with a new P-CSCF as the P-CSCF in which the problem occurred has been restored.

Hereinafter, the aforementioned description will be given based on a relation between respective network nodes with reference to FIG. 9. Referring to FIG. 9, in step S9001a, the SMF should transmit the Session Management message to the UE regarding the PDU session associated with the non-3GPP access. That is, the SMF transmits a Namf_Communication_N1N2MessageTransfer message, which includes the SM message, to the AMF. FIG. 9 illustrates that the SMF transmits a PDU Session Modification Command, which includes a new P-CSCF list, to the UE to provide the UE with the new P-CSCF list. In step S9001b, the AMF transmits a response to the Namf_Communication_N1N2MessageTransfer to the SMF.

The UE is registered with the same PLMN with respect to the 3GPP access and the non-3GPP access, and the non-3GPP access is CM-IDLE. The 3GPP access is also CM-IDLE. The AMF pages the UE through the 3GPP (step S9002a). In step S9002b, the UE is registered with the same PLMN with respect to the 3GPP access and the non-3GPP access, and the non-3GPP access is CM-IDLE. The 3GPP access is CM-CONNECTED. The AMF transmits a NAS Notification message to the UE through the 3GPP access. In step S9003, the UE performs a Service Request operation through the 3GPP access. Steps S9002a, 2b, and 3 will be understood with reference to clause 4.2.3.2 (UE Triggered Service Request) of TS 23.502 and clause 4.2.3.3 (Network Triggered Service Request) of TS 23502.

In step S9004, the AMF transmits the PDU Session Modification Command to the UE. In step S9005, the UE determines to activate the corresponding PDU Session based on the received PDU Session Modification Command, and checks whether the PDU Session can be activated in the 3GPP access. This may be based on whether UE policy (traffic/PDU Session related steering/routing policy or URSP of UE) and S-NSSAI of the PDU Session are included in Allowed NSSAI for the 3GPP access.

If the PDU Session can be activated in the 3GPP access, the UE responds to the received SM message and performs a related operation by using information included in the SM message. A case that the PDU Session cannot be activated in the 3GPP access may occur. This case is shown in FIG. 9. The UE transmits a PDU Session Modification Command Reject message to the SMF (step S9005). At this time, this reject message may include a cause related to the reject, that is, cause information. As the cause, the existing cause value may be used as described later or a new cause value may newly be defined (e.g., Access Type cannot be changed, reactivation of the PDU Session in the 3GPP access is not allowed, the 3GPP access cannot be used for the PDU Session, the PDU Session cannot move to the 3GPP access, etc.).

The SMF may determine to later provide the UE with a new P-CSCF list based on the PDU Session Modification Command Reject message received from the UE. In this case, 'later' means the case (after) that the UE is CM-CONNECTED in the non-3GPP access. After the case, information or marking indicating that the new P-CSCF list should be provided to the UE may be recorded in UE context stored by the SMF.

In steps S9006a and S9006b, the SMF may be subscribed to a service for requesting the AMF to report occurrence of a corresponding event (that is, Connectivity for the non-3GPP access changes (CM-IDLE or CM-CONNECTED)), if any, to identify whether the UE has been CM-CONNECTED for the non-3GPP access. At this time, Namf_EventExposure_Subscribe may be used. The AMF responds to a service subscription request of the SMF. Details for the steps S9006a and S9006b will be understood with reference to clause 5.2.2.3 (Namf_EventExposure service) of TS 23.502.

In step S9007, the UE is able to be connected to the non-3GPP access at some point. Therefore, the UE performs a Service Request procedure through the non-3GPP access. The UE may active some or all of PDU Sessions for the non-3GPP access.

Subsequently, A) is the case that an IMS PDU Session is activated, and B) is the case that the IMS PDU Session is not activated. Each case will be described separately.

A) Case that IMS PDU Session is Activated

Since the IMS PDU Session is activated, the AMF performs interaction for PDU Session activation with the SMF (this SMF is the SMF which has performed the steps S9001 and S9006) in step S9008a. Therefore, the AMF transmits a Nsmf_PDUSession_UpdateSMContext Request message to the SMF. The SMF recognizes that the UE has been connected through the non-3GPP access. In this case, the Nsmf_PDUSession_UpdateSMContext Request message is to activate a User plane of the PDU sessions, and may include PDU Session ID(s), Operation Type, UE location information, Access Type, RAT Type, UE presence in LADN service area, Indication of Access Type that can be changed, etc.

Afterwards, the remaining Service Request procedure (see clause 4.2.3.2 (UE Triggered Service Request) of TS 23.502) is performed. In step S9009a, the SMF determines to provide the UE with a new P-CSCF list. Therefore, the SMF transmits a PDU Session Modification Command, which includes the new P-CSCF list, to the AMF. In step S9010a, the AMF transmits a response to Namf_Communication_N1N2MessageTransfer to the SMF in the same manner as the step S9001b. In step S9011a, the AMF transfers the PDU Session Modification Command to the UE. In step S9012a, the UE responds to the PDU Session Modification Command.

In the aforementioned description, the SMF performs the PDU Session Modification procedure separately from the Service Request procedure to provide the UE with the new P-CSCF list. However, unlike the aforementioned description, the SMF may transmit the SM message, which includes the new P-CSCF list, within the Service Request procedure. To this end, the SMF may generate the SM message transmitted to the UE, and may include the new P-CSCF list in the SM message if the SM message should be transmitted for another purpose of use. Alternatively, information (or information indicating that P-CSCF failure has occurred, information indicating that IMS signal should not be transmitted until the new P-CSCF list is provided, or information indicating that IMS signal should not be transmitted to the existing P-CSCF) indicating that the SMF will provide the UE with the new P-CSCF list may only be transmitted within the Service Request procedure. For this reason, the SMF may allow the UE not to perform IMS operation with the existing P-CSCF.

B) Case that IMS PDU Session is not Activated

In step S9008b, the AMF reports, to the SMF (this SMF is the SMF which has performed the steps S9001 and S9006), that the UE is CM-CONNECTED through the non-3GPP access. Therefore, the SMF recognizes that the UE has been connected through the non-3GPP access. Namf_EventExposure_Notify may be used for the report, and details will be understood with reference to clause 5.2.2.3 (Namf_EventExposure service) of TS 23.502.

Since the steps S9009b to S90012b are the same as the steps S9009a to S90012a, their description will be omitted. In step S9013b, the UE determines to activate the PDU Session based on the PDU Session Modification Command. Therefore, the UE transmits a Service Request message to a network, and then the Service Request procedure (see clause 4.2.3.2 (UE Triggered Service Request) of TS 23.502) is performed.

Subsequently, in step S9014, the UE performs IMS registration with the new P-CSCF. That is, the UE transmits SIP Register message toward the P-CSCF which is newly selected.

In the above operation, (through step S9008a or step S9008b) the SMF has recognized that the UE has been connected through the non-3GPP access after the step S9005. In this state, when the SMF identifies that the P-CSCF having a failure has been restored or determines that the new P-CSCF list may not be provided to the UE, the SMF may not provide the UE with the new P-CSCF list.

Embodiment 2

The second embodiment relates to a method for transmitting the new P-CSCF list to the UE while again establishing the PDU Session after the SMF releases the PDU Session for P-CSCF Restoration. Hereinafter, the method of the second embodiment will be described in detail with reference to FIG. 10.

In step S1001a, the SMF should transmit the Session Management message to the UE regarding the PDU Session associated with the non-3GPP access. Therefore, the SMF transmits a Namf_Communication_N1N2MessageTransfer message, which includes the SM message, to the AMF. FIG. 10 illustrates that the SMF transmits a PDU Session Release Command, which includes information indicating PDU Session re-establishment, to the UE to provide the UE with the new P-CSCF list. Since steps S1001b-3 are the same as the steps S901b-3 of FIG. 9, their description will be replaced with the description of the steps S901b-3 of FIG. 9.

In step S1004, the AMF transmits a PDU Session Release Command to the UE. In step S1005, the UE determines to activate the corresponding PDU Session on the basis of the received PDU Session Release Command. This may be construed that the PDU Session is activated as the PDU Session is re-established immediately after being released.

The UE checks whether the PDU Session can be activated (or established) in the 3GPP access. This may be based on whether UE policy (traffic/PDU Session related steering/routing policy or URSP of UE) and S-NSSAI of the PDU Session are included in Allowed NSSAI for the 3GPP access. If the PDU Session can be activated/established in the 3GPP access, the UE responds to the received SM message and performs a related operation by using information included in the SM message. FIG. 10 relates to a case that the PDU Session cannot be activated/established in the 3GPP access, wherein the UE transmits a PDU Session Release Command Reject message to the SMF. At this time, this reject message may include a cause related to the reject, that is, cause information. The cause information will be understood with reference to the disclosure in the step S905 of FIG. 9.

The SMF may determine to later provide the UE with a new P-CSCF list based on the PDU Session Release Command Reject message received from the UE. This means that the UE is CM-CONNECTED in the non-3GPP access. Information or marking indicating that the new P-CSCF list should later be provided to the UE may be recorded in UE context stored by the SMF.

Figure 9:
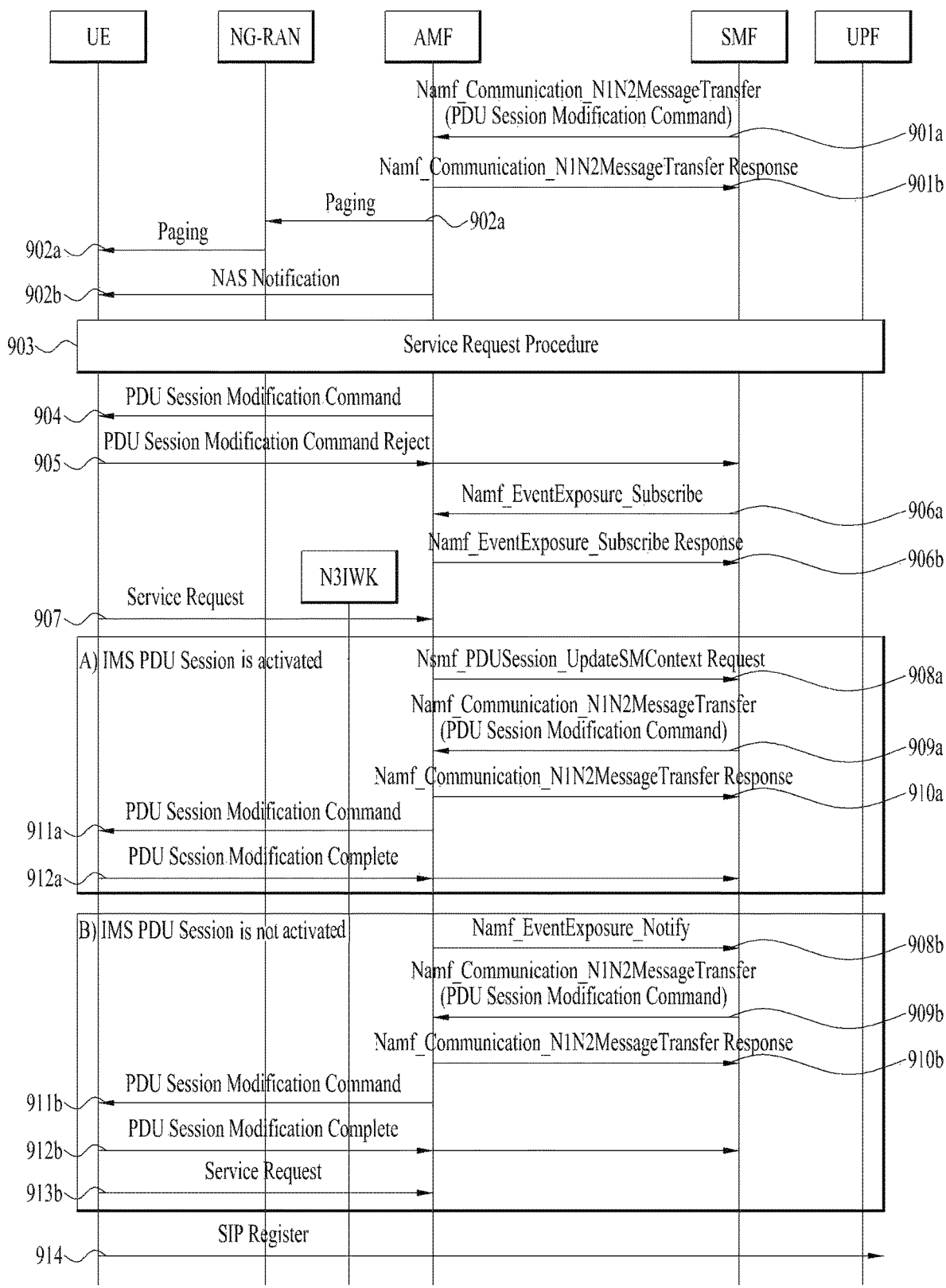
FIGS. 9 to 11 are diagrams illustrating each embodiment of the present invention.
Figure 10:
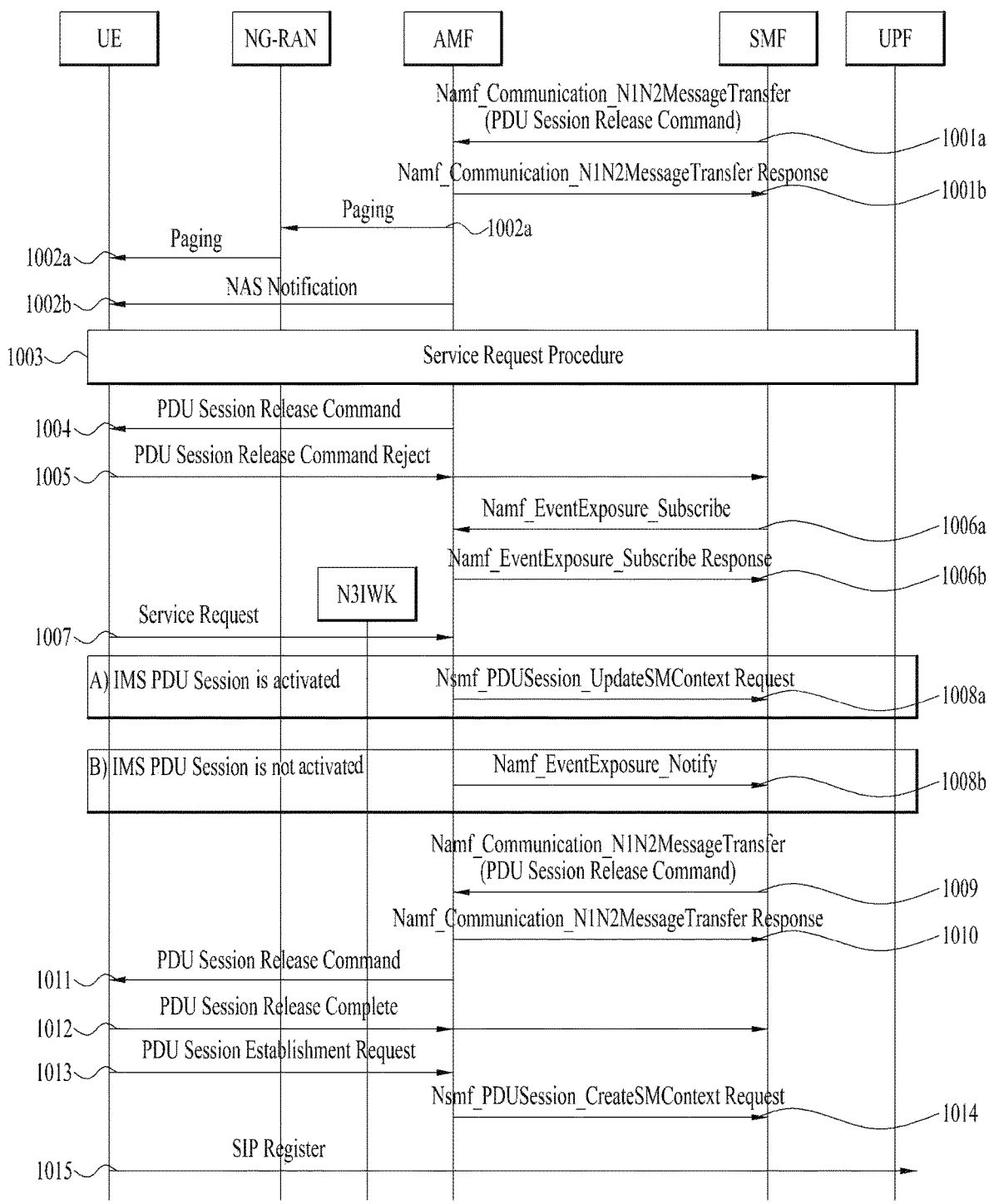
Figure 11:
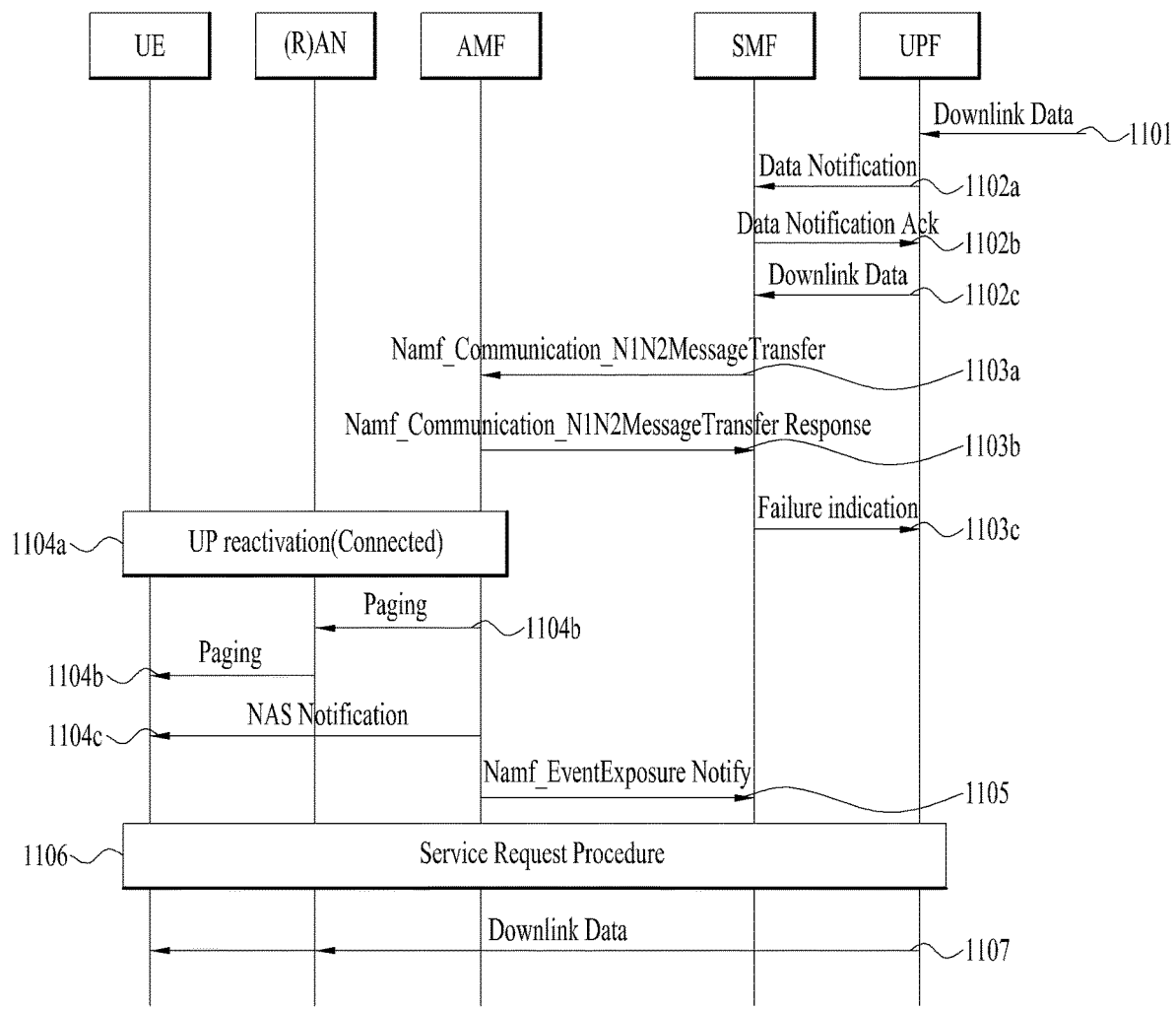

Since steps S1006a-7 are the same as the steps S906a-7 of FIG. 9, their description will be replaced with the description of the steps S906a-7 of FIG. 9.

A) is the case that an IMS PDU Session is activated, and step S1008a is the same as the step S908a of FIG. 9. B) is the case that the IMS PDU Session is not activated, and step S1008b is the same as the step S908b of FIG. 9.

In step S1009, the SMF determines to provide the UE with the new P-CSCF list. Therefore, the SMF transmits the PDU Session Release Command, which includes information indicating PDU Session re-establishment, to the AMF.

In step S1010, the AMF transmits a response to Namf_Communication_N1N2MessageTransfer to the SMF in the same manner as the step S1001b. In step S1011, the AMF transmits the PDU Session Release Command to the UE. In step S1012, the UE responds to the PDU Session Release Command. Therefore, the PDU Session is released.

Information (or information indicating that P-CSCF failure has occurred, information indicating that IMS signal should not be transmitted until the new P-CSCF list is provided, or information indicating that IMS signal should not be transmitted to the existing P-CSCF) indicating that the SMF will provide the UE with the new P-CSCF list may be transmitted within the Service Request procedure performed due to the step S1007. For this reason, the UE may be allowed not to perform IMS operation with the existing P-CSCF.

In step S1013, the UE initiates a PDU Session Establishment procedure for the released PDU Session. Therefore, the UE transmits a PDU Session Establishment Request message. The AMF performs interaction for PDU Session generation with the SMF. Therefore, the AMF transmits Nsmf_PDUSession_CreateSMContext Request message to the SMF. Afterwards, the PDU Session Establishment procedure (see clause 4.3.2.2 (UE Requested PDU Session Establishment) of TS 23.502) is performed.

In step S1014, the UE performs IMS registration with the new P-CSCF. That is, the UE transmits SIP Register message toward the P-CSCF which is newly selected. Information on the new P-CSCF may be provided from the SMF through the PDU Session Establishment procedure.

(Through step S1008*a* or step S1008*b*) the SMF has recognized that the UE has been connected through the non-3GPP access after the step S1005. In this state, if the SMF identifies that the P-CSCF having a failure has been restored or determines that the new P-CSCF list may not be provided to the UE, the SMF may not provide the UE with the new P-CSCF list.

Although the description of FIGS. 9 and 10 has been given based on the P-CSCF restoration operation, this may be applied to the case that the corresponding PDU Session should be activated as a result of the SM message received from the SMF to the UE.

Hereinafter, embodiments will be described based on that the AMF may or may not transmit the Session Management (SM) message for the PDU Session associated with the non-3GPP access to the UE regardless of whether the UE can activate the PDU Session through the 3GPP access.

Embodiment 3

In step S1103*a*, the SMF should transmit a Session Management message (this may be expressed as SM message or SM signal or N1 SM container) to the UE regarding the PDU Session associated with the non-3GPP access. Therefore, the SMF transmits Namf_Communication_N1N2MessageTransfer message, which includes the SM message, to the AMF. At this time, the SMF may further include one or more of the followings a) to e).

a) Information indicating a request due to the Session Management message (or SM signal or N1 SM container): even though the Namf_Communication_N1N2MessageTransfer message does not include this information, since the Namf_Communication_N1N2MessageTransfer message includes only N1 SM container without including N2 SM information, the AMF may know that the request is caused by the SM message.

b) Information indicating that the SM message will be transmitted to the UE after checking through the UE (or if UE policy is allowed)

c) Information indicating that the SM message should be transmitted to the UE only if the PDU Session is included in a List Of Allowed PDU Sessions provided by the UE d) Information indicating that SM message transmission is allowed through only access in which the PDU Session can be activated e) Information indicating that a User Plane for the PDU Session will be activated by a subsequent task/operation of this request/procedure The SMF should transmit the SM message to the UE regarding the PDU session associated with the non-3GPP access to provide the UE with the new P-CSCF list. However, without limitation to this case, the SMF should transmit the SM message to the UE due to various cases disclosed in TS 23.501 and TS 23.502 such as the case that QoS should be updated, the case that UPF is reselected, and the case that a PDU Session Anchor is added in a multi-homing mode.

If the AMF receives Namf_Communication_N1N2MessageTransfer from the SMF, the AMF may know that the received message is for the non-3GPP PDU Session. Since the AMF stores access type together with PDU Session ID, the AMF may know that the received message is for the non-3GPP PDU Session. Also, since the received message includes access type associated with the PDU Session, the AMF may know that the received message is for the non-3GPP PDU Session.

If the non-3GPP access of the UE is CM-CONNECTED, the AMF transmits the SM message to the UE through the non-3GPP access. In this case, a problem does not occur.

If the non-3GPP access of the UE is CM-IDLE, there may be two cases. One of the two cases is the case that the 3GPP access is CM-IDLE, and the other one is the case that the 3GPP access is CM-CONNECTED. In the former case, the AMF pages the UE (step S1104*b*). In the latter case, the AMF may first transmit NAS Notification message to the UE instead of directly transmitting the SM message to the UE through the 3GPP access based on the above information (step S1104*c*).

In step S1106, if the UE receives a paging or NAS Notification message related to the non-3GPP access through the 3GPP access, the UE may perform the Service Request procedure through the 3GPP access. At this time, the UE may indicate the PDU Session, which can be activated through the 3GPP access, through a List Of Allowed PDU Sessions parameter.

The AMF may determine to transmit the SM message to the UE based on the information described in the step S1103*a* only if the PDU Session for the SM message can be activated through the 3GPP access. Therefore, the AMF checks transmission of the message, from the Service Request message received from the UE.

If the PDU Session for the SM message can be activated through the 3GPP access, the AMF transmits the SM message to the UE. Unlike this case, if the PDU Session for the SM message cannot be activated through the 3GPP access, the AMF does not transmit the SM message to the UE. Additionally, the AMF may transmit, to the SMF, a message reporting that the SM message is not transmitted.

Embodiment 4

The method for not transmitting the related SM message to the UE through the 3GPP access if the PDU Session cannot be activated through the 3GPP access due to additional operation of the SMF and the AMF has been described in the embodiment 3. Unlike the embodiment 3, the SM message may unconditionally be transmitted to the UE through the 3GPP access regardless of whether the PDU Session can be activated through the 3GPP access. Therefore, the embodiment 4 may be similar to the above-described embodiments 1 and 2, and thus may commonly be applied to the respective embodiments unless it corresponds to a conflict range of the related description.

This means that the SM message is transmitted to the UE through the 3GPP access after paging if the 3GPP access of the UE is CM-ILDE, whereas the SM message is directly transmitted to the UE through the 3GPP access if the 3GPP access of the UE is CM-CONNECTED. (However, unlike this case, after the NAS notification message is transmitted through the 3GPP access, the SM message may be transmitted to the UE by receiving a response to the NAS Notification message from the UE.)

In this way, if the UE receives the SM message, the UE performs the following operations.

1) The UE checks an object of the corresponding SM message. This may be construed that it is checked whether it is required to activate the User Plane of the corresponding PDU Session due to the SM message.

2) If it is not required to activate the User Plane of the corresponding PDU Session due to the SM message, the UE performs a related operation by using the information included in the SM message. The UE may transmit a response (this is ACK) to the SM message to the SMF through the AMF. This response is also transmitted through the 3GPP access. For example, if the SM message is for QoS update, updated QoS may be applied to the corresponding PDU Session, or if the SM message is for releasing the PDU Session, the PDU Session is released. Since it is not required to activate the User Plane of the PDU Session, the UE and the network (AMF or SMF) may maintain the associated access type of the PDU Session as the non-3GPP access after performing the above operation. Unlike this case, if the PDU Session can be activated through the 3GPP access, the UE and the network (AMF or SMF) may modify the associated access type to the 3GPP access after performing the above operation. The latter case may always be the case, or may be performed in accordance with a type of the SM message, configuration information on the UE, etc. If the access type is changed to the 3GPP access, the modification is applied to both the UE and the network. (Synchronization is made through an interactive message or the same modification is always made.)

3) If it is required to activate the User Plane of the corresponding PDU Session due to the SM message, the UE checks whether the PDU Session can be activated through the 3GPP access, by using UE policy. At this time, the UE policy may be traffic/PDU Session related steering/routing policy or URSP(UE Routing Selection Policy of the UE.

3-1) If this PDU Session can be activated through the 3GPP access, the UE performs a related operation by using the information included in the SM message. The UE may transmit a response (this is ACK or ACK information is included in Response message) to the SM message to the SMF through the AMF. This response is also transmitted through the 3GPP access. For example, if the SM message includes the new P-CSCF list, the UE performs an operation for activating IMS PDU Session through the 3GPP access (an operation for activating the User Plane of the corresponding PDU Session through the Service Request procedure or moving the corresponding PDU Session to the 3GPP access through a PDU Session handover procedure between the Non-3GPP access and the 3GPP access), and performs the IMS registration procedure for the new P-CSCF.

Since the User Plane of the PDU Session is activated, the UE and the network (AMF or SMF) modifies the associated access type of the PDU Session to the 3GPP access.

3-2) If the PDU Session cannot be activated in the 3GPP access, the UE does not perform the operation based on the information included in the SM message. The response (this is NACK or NACK information is included in the response message) to the SM message may be transmitted to the SMF through the AMF. This response is transmitted through the 3GPP access.

If the SM message transmitted to the UE is a PDU Session Modification Command, the UE may use a PDU Session Modification Complete or PDU Session Modification Command Reject as the response message. If the PDU Session Modification Complete message is used, a new information element (IE) may be added to include a cause. In detail, the PDU session modification complete message of Table 2 and the PDU session modification command reject message of Table 3 are defined in TS 24.501, and may include a cause.

TABLE 2

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION MODIFICATION COMPLETE message identity | Message type 9.7 | M | V | 1 |
| 7B | Extended protocol configuration options | Extended protocol configuration options 9.11.4.6 | O | TLV-E | 4-65538 |

TABLE 3

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |

TABLE 3-continued

| IEI | Information Element | Type/Reference | Presence | Format | Length |
|---|---|---|---|---|---|
| | PTI | Procedure transaction identity 9.6 | M | V | 1 |
| | PDU SESSION MODIFICATION COMMAND REJECT message identity | Message type 9.7 | M | V | 1 |
| | 5GSM cause | 5GSM cause 9.11.4.2 | M | V | 1 |
| 7B | Extended protocol configuration options | Extended protocol configuration options 9.11.4.6 | O | TLV-E | 4-65538 |

If the SM message transmitted to the UE is the PDU Session Release Command, the UE may use the PDU Session Release Complete or PDU Session Release Command Reject of Table 4, which is defined in TS 24.501, as the response message (by defining the message for the present invention), wherein the message may include a cause.

TABLE 4

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION RELEASE COMPLETE message identity | Message type 9.7 | M | V | 1 |
| 59 | 5GSM cause | 5GSM cause 9.11.4.2 | O | TV | 2 |
| 7B | Extended protocol configuration options | Extended protocol configuration options 9.11.4.6 | O | TLV-E | 4-65538 |

As a cause value included in the response message, the existing cause value may be used, or a new cause value may newly be defined (e.g., Access Type cannot be changed, reactivation of the PDU Session in the 3GPP access is not allowed, the 3GPP access cannot be used for the PDU Session, the PDU Session cannot move to the 3GPP access, etc.). The SM message and cause related details are applied to the overall of the present invention.

If the SM message includes the new P-CSCF list, the UE does not perform the operation for activating the IMS PDU Session in the 3GPP access. However, the operation for transferring the received new P-CSCF list to an IMS layer of the UE may be performed internally. This is to perform IMS registration with the new P-CSCF through the non-3GPP access if the UE is later available for the non-3GPP access. Additionally, the UE may explicitly or implicitly transfer information indicating that the non-3GPP access is not available when the new P-CSCF list is transferred to the IMS layer of the UE. The decision of the UE may be notified to the SMF explicitly or implicitly through the response message transmitted from the UE.

For another example, if the SM message is a PDU Session Release Command, which includes a cause indicating re-establishment of the PDU Session through the same Data Network (DN), the UE does not release the PDU Session. The decision of the UE may be notified to the SMF explicitly or implicitly through the response message transmitted from the UE.

For another example, if the SM message is a PDU Session Release Command, which includes a cause indicating re-establishment of the PDU Session through the same Data Network (DN), the UE releases the PDU Session. However, the UE does not re-establishes the PDU Session. The decision of the UE may be notified to the SMF explicitly or implicitly through the response message transmitted from the UE.

The SMF may perform interaction with the PCF based on the response message transmitted from the UE and the cause value included in the response message. For this reason, the PCF may update PCC Rule(s) and/or URSP to re-activate the PDU Session in the 3GPP access.

Embodiment 5

The embodiment 5 also relates to the case that the non-3GPP PDU Session related SM message is unconditionally transmitted to the UE through the 3GPP access regardless of whether the PDU Session can be activated through the 3GPP access.

If the UE receives the SM message, the UE performs the following operations.

1) The UE checks whether transmission of the corresponding SM message can be performed through the 3GPP access (or whether ACK response can be transmitted through the 3GPP access) by using a related policy. This policy may be the policy configured as to whether the corresponding SM message can be performed through the 3GPP access in accordance with types (e.g., PDU Session Modification Command, PDU Session Release Command, etc.) of the SM message, purpose of use/property (e.g., QoS update, providing new P-CSCF list, etc.) of the SM message, a subsequent operation (User Plane activation of the PDU Session is required), etc.

2) If transmission of the corresponding SM message can be performed through the 3GPP access, the UE performs a related operation by using the information included in the SM message. The response (this is ACK or ACK information is included in the response message) to the SM message may be transmitted to the SMF through the AMF. This response is transmitted through the 3GPP access.

3) If transmission of the corresponding SM message cannot be performed through the 3GPP access, the UE does not perform the operation based on the information included in the SM message. The response (this is NACK or NACK information is included in the response message) to the SM message may be transmitted to the SMF through the AMF. This response is transmitted through the 3GPP access. The response message will be understood with reference to the details disclosed in 3-1) of the embodiment 4.

General Device to which the Present Invention is Applicable

Figure 12:
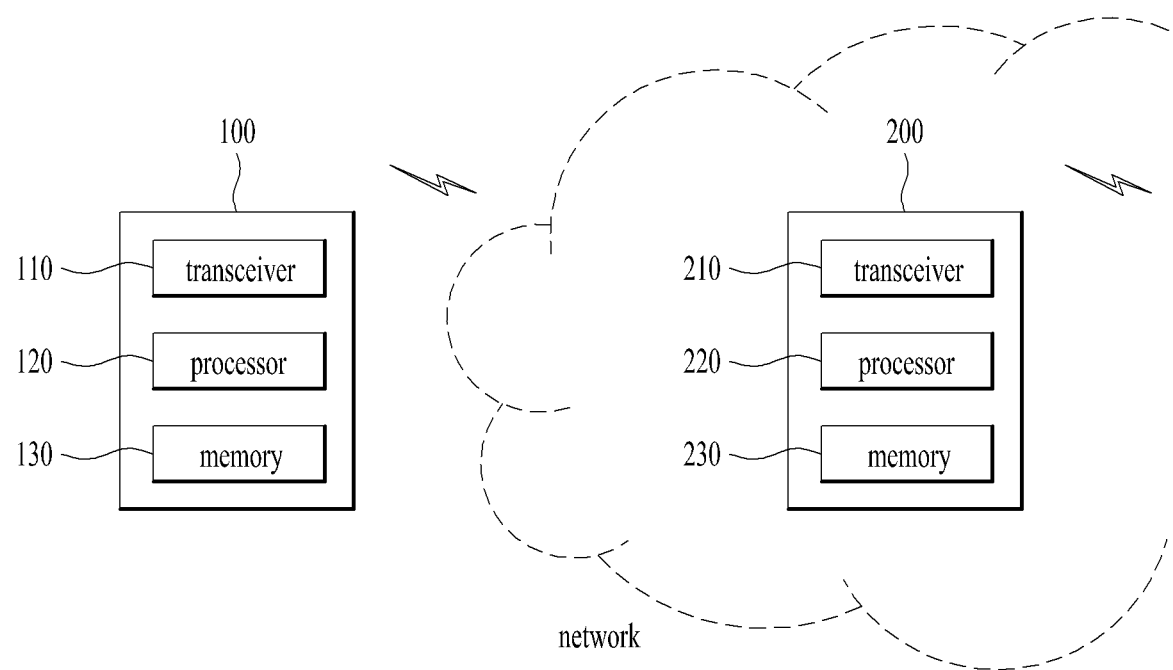
FIG. 12 is a diagram illustrating a configuration of a user equipment and a network node device according to an embodiment of the present invention.

FIG. 12 is a diagram illustrating a configuration of a user equipment (UE) and a network node device according to the embodiment of the present invention.

Referring to FIG. 12, the network node device 200 according to the present invention may include a transceiver 210, and a device 220 for a wireless communication system. The device 220 may include a memory and at least one processor coupled to the memory. The transceiver 210 may be configured to transmit various signals, data and information to an external device and to receive various signals, data and information from the external device. The network node device 200 may be connected with the external device through the wire and/or wireless. The at least one processor may control the overall operation of the network node device 200, and may be configured to allow the network node device 200 to perform a function of operation-processing information to be transmitted to and received from the external device. The memory may store the operation-processed information for a predetermined time, and may be replaced with a buffer (not shown). Also, the processor may be configured to perform a network node operation suggested in the present invention.

In detail, the at least one processor may receive a reject message (PDU Session Modification Command Reject) for a message related to an activation command of a PDU Session from the UE, request, to an AMF, information on non-3GPP connection state modification of the UE, receive a message indicating that a non-3GPP connection state of the UE has been changed, from the AMF, and transmit the message related to the activation command of the PDU Session, which includes a new P-CSCF list, to the UE, wherein the message indicating that the non-3GPP connection state of the UE has been changed may indicate that the non-3GPP access of the UE has been changed from CM-IDLE to CM-connected.

Referring to FIG. 12, the UE 100 according to the present invention may include a transceiver 110, and a device 120 for a wireless communication system. The device 120 may include a memory and at least one processor coupled to the memory. The transceiver 110 may be configured to transmit various signals, data and information to an external device and receive various signals, data and information from the external device. The UE 100 may be connected with the external device through the wire and/or wireless. The at least one processor may control the overall operation of the UE 100, and may be configured to allow the UE 100 to perform a function of operation-processing information to be transmitted to and received from the external device. The memory may store the operation-processed information for a predetermined time, and may be replaced with a buffer (not shown). Also, the processor may be configured to perform a UE operation suggested in the present invention.

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

What is claimed is:

1. A method for transmitting or receiving a signal of a Session Management Function (SMF) in a wireless communication system, the method comprising:
    receiving, by the SMF from a User Equipment (UE), a reject message for a message related to an activation command of a Protocol Data Unit (PDU) session, wherein the SMF determines to delay transmission of a new P-CSCF (Proxy-Call Session Control Function) list based on the reject message;
    requesting, to an Access Management Function (AMF) by the SMF, information on a non-3GPP connection state modification of the UE; and
    based on a reception of a message indicating that a non-3GPP connection state of the UE has been changed from CM-IDLE to CM-connected, transmitting, to the UE by the SMF, the message related to the activation command of the PDU session, which includes the new P-CSCF list.

2. The method of claim 1, wherein the message related to the activation command of the PDU session is transmitted to the UE in a state of P-CSCF failure.

3. The method of claim 2, wherein the message related to the activation command of the PDU session is not transmitted when the SMF determines that P-CSCF having the P-CSCF failure has been restored.

4. The method of claim 1, wherein the message related to the activation command of the PDU session is transmitted to the UE regardless of whether the UE can activate the PDU session through the 3GPP access.

5. The method of claim 1, wherein the message indicating that the non-3GPP connection state of the UE has been changed is Nsmf_PDUSession_UpdateSMContext Request message when IMS PDU session is activated.

6. The method of claim 1, wherein the message indicating that the non-3GPP connection state of the UE has been changed is Namf_EventExposure_Notify message when IMS PDU session is not activated.

7. The method of claim 1, wherein the PDU session is a non-3GPP PDU session.

8. The method of claim 1, wherein the message related to the activation command of the PDU session is a PDU Session Modification Command.

9. The method of claim 1, wherein the UE is registered with the same PLMN with respect to the 3GPP access and the non-3GPP access.

10. An SMF device in a wireless communication system, the SMF device comprising:

a memory; and at least one processor coupled to the memory, wherein the at least one processor is configured to perform operating comprising:

receiving, from a User Equipment (UE), a reject message (PDU Session Modification Command Reject) for a message related to an activation command of a PDU Session, wherein the SMF determines to delay transmission of a new P-CSCF (Proxy-Call Session Control Function) list based on the reject message, requesting, to an AMF, information on a non-3GPP connection state modification of the UE, and based on a reception of a message indicating that a non-3GPP connection state of the UE has been changed from CM-IDLE to CM-connected, transmitting the message related to the activation command of the PDU Session, which includes the new P-CSCF list, to the UE.

11. The SMF device of claim 10, wherein the message related to the activation command of the PDU session is transmitted to the UE in a state of P-CSCF failure.

12. The SMF device of claim 11, wherein the message related to the activation command of the PDU session is not transmitted when the SMF determines that P-CSCF having the P-CSCF failure has been restored.

* * * * *